United States Patent [19]

Goans

[11] Patent Number: 4,831,957
[45] Date of Patent: May 23, 1989

[54] FIRST TRIP INDICATOR FOR SENSING DEVICES OF PRODUCTION CONTROL AND SAFETY SYSTEMS

[76] Inventor: Kip B. Goans, 2576 Apollo Ave., Harvey, La. 70058

[21] Appl. No.: 869,282

[22] Filed: Jun. 2, 1986

[51] Int. Cl.$^4$ .............................................. G01L 19/12
[52] U.S. Cl. ...................................... 116/272; 116/266
[58] Field of Search ............... 116/34 R, 70, 138, 264, 116/266, 268, 272, 281, 283, DIG. 8, DIG. 25, 112, 273; 137/227, 557; 73/146.2, 146.3, 146.8

[56] References Cited

U.S. PATENT DOCUMENTS

| | | | |
|---|---|---|---|
| 1,420,110 | 6/1922 | Kligge | 116/272 |
| 1,488,754 | 4/1924 | Kempel | 116/272 |
| 1,497,441 | 6/1924 | Henemier et al. | 73/146.3 |
| 1,610,452 | 12/1926 | Kennedy | 116/34 R |
| 4,246,933 | 1/1981 | Taylor | 137/552 |

Primary Examiner—William A. Cuchlinski, Jr.
Assistant Examiner—W. Morris Worth
Attorney, Agent, or Firm—Hubbard, Thurman, Turner & Tucker

[57] ABSTRACT

Three concentric hollow cylinders, with radii for slidably loose interfitting, are coaxially assembled against separation and partially sealed by a combination slotted seal and detent, for telescoping outwardly when actuated by exhaust pressure from a sensing device to expose a formerly hidden strip on one of the cylinder sides, and then to open a passage to prevent back pressure from affecting the sensing device. The partial sealing prevents slight leakage of exhaust pressure from outwardly telescoping the cylinders. The expansion of the slotted seal and detent when not compressed by telescoping cylinders engages resetting cylinder edges that are rounded. The detent is operable to prevent resetting but is overridable manually, the slotted seal and detent being recompressable by the rounded surfaces engagement without damage.

5 Claims, 1 Drawing Sheet

FIRST TRIP INDICATOR FOR SENSING DEVICES OF PRODUCTION CONTROL AND SAFETY SYSTEMS

BACKGROUND OF THE INVENTION

The invention relates generally to monitoring safety and production control systems of industrial processes, and more particularly to a trip indicator that remains tripped until manually reset for indicating an area of system trouble that many temporarily self-correct before being identified for permanent correction.

The invention teaches a trip indicator of compact size, shape and simple design for threadably engaging, in restricted space, in an exhaust port of a sensing device that is left operably unaffected thereby.

SUMMARY OF THE INVENTION

The trip indicator utilizes exhaust pressure from a sensing device to slidably expand telescoped cylinders to display a warning strip and then escape to prevent any backup pressure from affecting the sensing device, the indicator being left only manually resettable after displaying the warning strip.

It is an object of the invention to provide a trip indicator having simultaneously telescoping hollow cylinders that require minimum space for operation and installation.

Another object of the invention is to provide a leaky seal between the outer telescoping cylinders that unseals after the indicator is tripped.

Another object of the invention is to provide a plurality of means for preventing reset of invention by other than manual means.

DETAILED DESCRIPTION OF THE PREFERRED EMBODIMENTS

Figure 1:
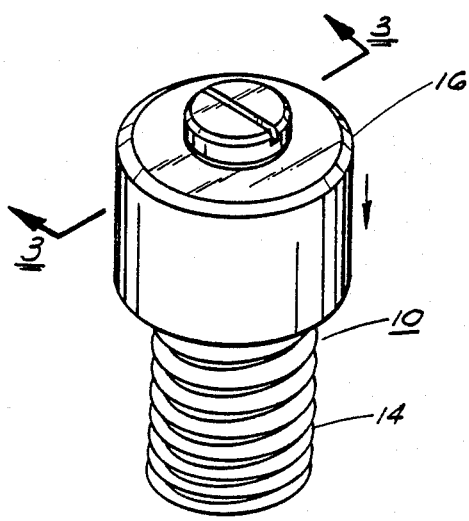
FIG. 1 is a perspective view from the upper right of the invention in telescoped set condition.

Referring to FIGS. 1-4, the invention, a trip indicator 10, comprises inner, intermediate and outer hollow cylinders 12, 14 and 16, with cylinders 16 and 12 fixed together by an end bolt 20 at adjacent ends which are sealably closed by a gasket 21, and cylinder 12 defining radial holes 17 between its ends. The connected cylinders are coaxially and slidably telescoped around and in cylinder 14. A slotted "O" ring 18 is mounted between cylinders 16 and 14 as a leaky seal for triggering the indicator by exhaust pressure but not by exhaust leaks, and as a partial detent for helping to stop all indicator resetting other than manual.

The intermediate cylinder or body 14 has oppositely disposed open ends 22 and 24, and is threaded exteriorly adjacent end 22 for engaging in a sensing device exhaust (not shown). Peripheral shoulders 26 and 28 extend around end 24 radially and both exteriorly and interiorly, respectively. Exterior shoulder 26 defines a groove seat 29 for the slotted "O" ring 18 to extend slightly therebeyond as a partial detent. A circumferential red warning stripe 30 extends intermediate said seat 29 and the exterior threading of cylinder 14.

The inner cylinder 12 is shorter than cylinder 14 and has oppositely disposed open ends 32 and 34, and is interiorly threaded around and adjacent to end 34; defines a diametrical slot 36 in end 32 and an exterior shoulder 38 therearound, as well as the previously mentioned holes 17. Cylinders 14 and 12 are coaxially engaged by exterior shoulder 38 slidably engaging in body end 22, and shoulder 28 slidably engaging cylinder 12. The cylinder shoulders 28 and 38 meet adjacent end 24 to prevent the cylinder 12 from telescoping out of said end.

The outer or cap cylinder 16 is shorter than inner cylinder 12 and has an open end 41 and a closed end 42 which defines a threaded axial bolt hole 44. Open end 41 has a rounded interior edge 46 and a diameter to slidably engage cylinder shoulder 26.

Figure 2:
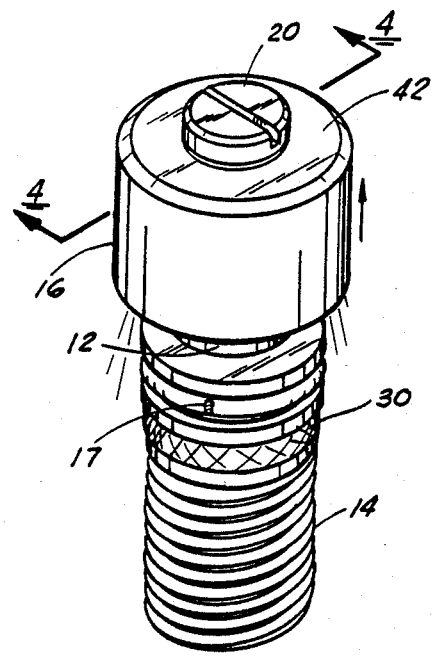
FIG. 2 is a view similar to FIG. 1, but showing the invention in expanded tripped condition.
Figure 3:
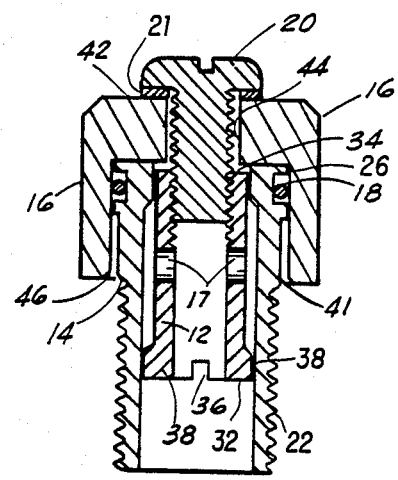
FIG. 3 is a vertical cross-sectional view of FIG. 1 taken along sectional lines 3—3.
Figure 4:
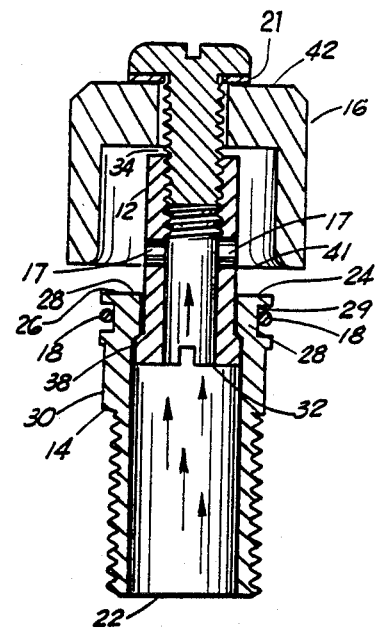
FIG. 4 is a view similar to FIG. 3, but taken along sectional lines 4—4 of FIG. 2.
Figure 5:
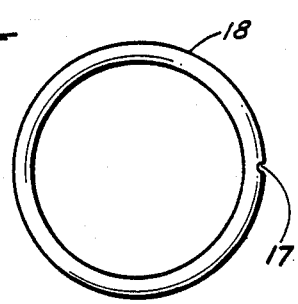
FIG. 5 is a plan view of a slotted "O" ring combination seal and detent.
Figure 6:
FIG. 6 is a side view of FIG. 5.

Threaded bolt 20 engages up to its slotted head through threaded hole 44 and into the threaded cylinder end 34 to fix cap cylinder 16 and inner cylinder 12 in coaxial alignment with the inner cylinder 12 vertically adjustable on the threaded bolt and in body 14 by rotation thereof by means of slot 36 to place the radial holes 17 within intermediate cylinder 14 when the indicator 10 is set as shown in FIGS. 1 and 3, and clear of body 14 when in tripped condition as shown in FIGS. 2 and 4.

In use, the trip indicator 10 is operably installed in a pressure exhaust of a sensing device (not shown) by means of the threaded end portion 22 of intermediate cylinder 14. In event of a sensing device alarm, exhaust pressure from the sensing device enters the cylinder end 22 to slidably telescope cylinders 12 and 16 axially outward for the lower edges of the cap 16 to clear "O" ring and detent 18 and body shoulder 26, and for shoulders 28 and 38 to engage and stop momentum of the telescoping parts from dissembling the indicator. Such outward movement of outer cylinder 16 permits a visual indication of the operation of trip indicator 10. Additionally, the red stripe 30 is exposed, and the exhaust pressure is dissipated through holes 17 and between the cap and the body to leave the sensing device operation unaffected. The cap and stem are prevented from from resetting by the projecting "O" ring and detent 18 engaging the open end rounded edge 46 of the cap, and also by slight nonconcentric misalignments of the telescoping cylinders which also frictionally prevents a slight leak of exhaust pressure escaping through said slotted "O" ring from triggering the indicator as well as binding the cylinders sufficiently to prevent any resetting except manual in which "O" ring and detent 18 is compressed between cap's 16 rounded lower end 41 and shoulder 26.

What is claimed is:

1. A trip indicator for sensing devices of production control and safety systems producing a pressured fluid discharge when activated, comprising:

(a) inner, outer and intermediate hollow cylinder means having oppositely disposed ends for coaxial assembly into a unitary structure axially expandable by fluid pressure applied to said inner cylinder means; means for defining a passage through said unitary structure when axially expanded;

(b) opposing shoulder means defined on oppositely disposed ends of said inner and intermediate cylinder means for engaging to prevent axial separation of said cylinder means through said ends;
(c) bolt means for coaxially and adjustably mounting said outer hollow cylinder means and said inner cylinder means;
(d) sealing and detent means retainably mounted between the shoulder end of said intermediate cylinder means and the adjacent inner wall of said outer cylinder means for the sealing of said passage when said unitary structure is not expanded by fluid pressure, and for the prevention of all but manual resealing of said passage;
(e) said passage including transverse openings defined transversely through said inner cylinder means intermediate its oppositely disposed ends for defining a passage between said inner cylinder means and the atmosphere when said unitary structure is axially expanded by fluid pressure;
(f) screw thread means defined exteriorly on said intermediate cylinder means and oppositely disposed from said shoulder end, for securing said indicator operably to said sensing device pressure exhaust; and
(g) and warning means.

2. A trip indicator as described in claim 1 wherein said slidably telescoping cylinder means and said sealing and detent means define slight clearances therebetween for additionally permitting slight leakage of exhaust pressure from said sensing device without tripping said indicator.

3. A trip indicator as described in claim 2 wherein said sealing and detent means comprises:
a combination "O" ring sealer and detent having a groove in its outer peripheral surface for effecting a partial seal between said intermediate and outer cylinder means when engaged therebetween.

4. A trip indicator as described in claim 3 wherein said outer cylinder means defines a rounded inner edge on its open end for engaging said combination "O" ring sealer and detent to prevent resetting of the indicator by vibration and gravity, but which is overridable manually without damage to said combination "O" ring sealer and detent.

5. The trip indicator of claim 1 wherein the warning means is on the exterior of said intermediate hollow cylinder means and is visible only in the axially expanded position of said unitary structure.

* * * * *